2 Sheets—Sheet 1.

A. S. HALLIDIE.

UNDERGROUND TUBES FOR PROPULSION OF CARS.

No. 7,339. Reissued Oct. 10, 1876.

Witnesses
Jno L. Boone
Owyn T. Stacy

Inventor
Andrew S. Hallidie
Dewey & Co
Attys

THE NORRIS PETERS CO., PHOTO-LITHO., WASHINGTON, D. C.

2 Sheets—Sheet 2.

A. S. HALLIDIE.

UNDERGROUND TUBES FOR PROPULSION OF CARS.

No. 7339 Reissued Oct. 10, 1876

Witnesses

John L. Boone

C. M. Richardson

And. S. Halidie

Dewey & Co.

Attys.

K. PETERS, PHOTO-LITHOGRAPHER, WASHINGTON, D. C.

UNITED STATES PATENT OFFICE.

ANDREW S. HALLIDIE, OF SAN FRANCISCO, CALIFORNIA.

IMPROVEMENT IN UNDERGROUND TUBES FOR PROPULSION OF CARS.

Specification forming part of Letters Patent No. 179,086, dated June 20, 1876; Reissue No. 7,339, dated October 10, 1876; application filed September 19, 1876.

*To all whom it may concern:*

Be it known that I, ANDREW S. HALLIDIE, of the city and county of San Francisco, and State of California, have invented Improvements in Propelling Cars; and I do hereby declare the following description and accompanying drawings are sufficient to enable any person skilled in the art or science to which it most nearly appertains to make and use my said invention or improvement without further invention or experiment.

My invention relates to certain improvements in mounting and managing the endless wire rope which is arranged to travel in a slotted tube underground for the purpose of propelling vehicles. When the rope is supported directly below the slot in the tube it is liable to become fouled by the foreign substances which are continually dropping into the tube through the slot, and in case a large body like a carriage-wheel should get through the slot and come in contact with the rope, considerable damage would result. To avoid this, I place the rope-supporting pulleys on one side of the slot, so that any foreign body or substance which may happen to drop through the slot will fall directly to the bottom of the tube without coming in contact with the rope.

At the bases of inclines where the directions of the tube and rope changes from one plane to another, I employ a depending or overhead pulley for receiving the upward strain of the rope, and which prevents it from striking the top of the tube.

At intervals along the top of the tube I make covered openings, through which the gripping attachment can be raised out for repairs.

Figure 1:
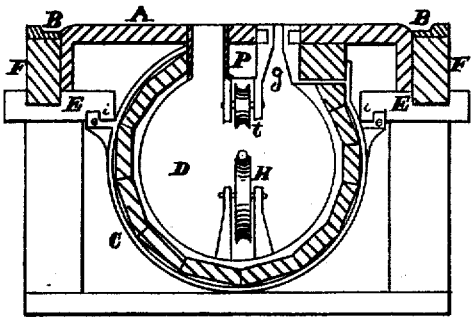
Figure 2:
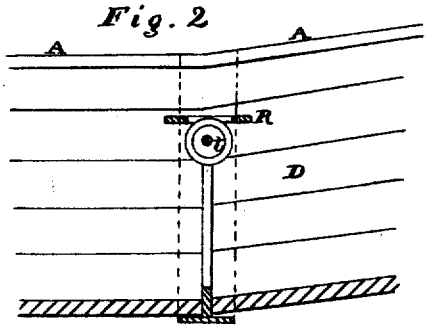
Figure 3:
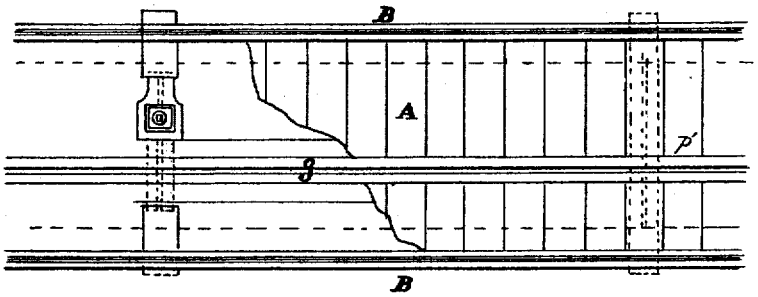
Figure 4:
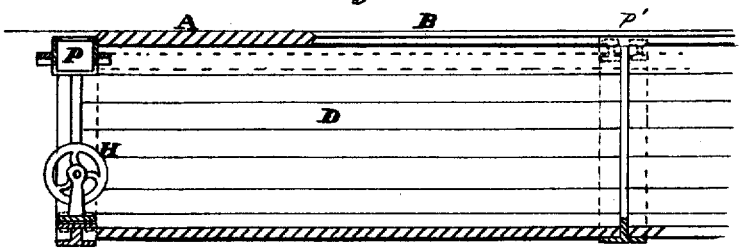
Figure 5:
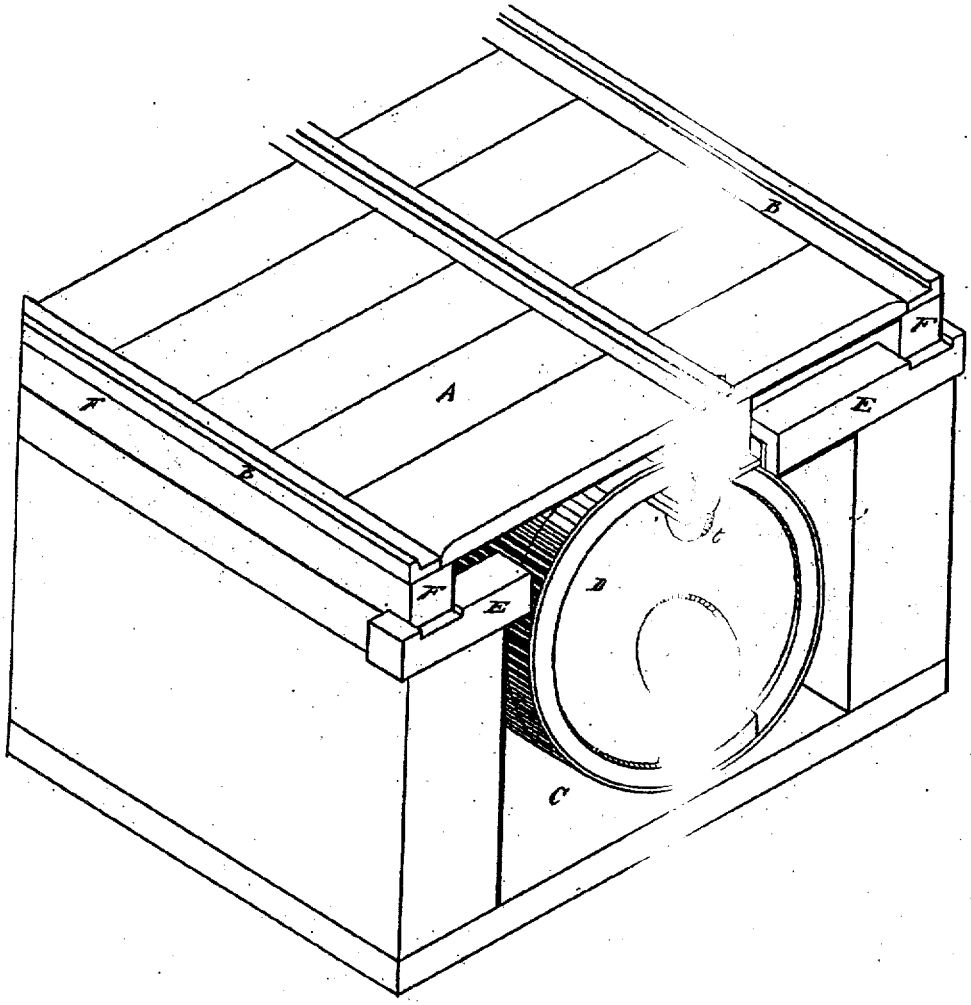

Referring to the accompanying drawings, Figure 1 represents a cross-section of my invention. Fig. 2 is a horizontal section, showing the manner of changing from a level to an incline. Fig. 3 is a plan or top view. Fig. 4 is a longitudinal sectional elevation of my device. Fig. 5 is a perspective view.

Let A represent the travel of a street. B B are the two tracks of a city or other railway, between which the tube or cylinder D is placed in a suitable excavation which is prepared to receive it. The ties or cross-timbers E, which support and bind the tracks together, will only require to be long enough to provide a bearing for the longitudinal track-supporting timbers F, and extend to the outer circumference of the cylinder or tube *c*, to the sides of which their inner ends are firmly secured by some strong and substantial fastening, thus making the tube or cylinder serve as a connection for the ties, and binding the whole together as a unit by means of the lugs *e* and the overlapping shoulders *i* of the short ties E.

The propelling-rope I mount upon pulleys H at one side of the slot inside of the tube, so that any foreign substance that may fall through the slot will drop to the bottom of the tube without coming in contact with the rope. The most convenient manner of accomplishing this is to make the slot at one side of the tube while the rope is mounted at or near its center.

It is not material on which side of the slot the rope is mounted so long as the gripper is made to correspond. I thus secure a very decided advantage in this class of railways, as my L-shaped gripping attachment patented by me on the 16th day of July, 1872, No. 129,130, will enable me to connect with the rope when it is thus mounted in relation to the tube.

At the bottom of the inclines, where the rope and tube change from a horizontal to an incline, I secure a depending or overhead pulley, *t*, so that the rope will pass below it at the lowest part of the incline, and thus prevent the rope from striking against the top of the tube when it is strained.

At points immediately above the supporting-pulley H, hand-holes P will be made in the tube to permit the oiling of the sheave and pulley bearings, and, at suitable distances apart, other openings, P′, closed by slides or covers, are made, through which the gripper can be raised clear of the tube. These openings are necessary in a tube of great length, along which a number of cars are each drawn by a separate gripper, as the grippers are apt to get out of order by the loosening of a nut or other derangement of its mechanism, and if no means were provided for permitting such damage to be repaired without towing the disabled car to one extremity of the tube, the travel of all the cars would be deranged, and this plan of propulsion materially affected.

Having thus described my invention, what

I claim, and desire to secure by Letters Patent, is—

1. The endless wire rope R and inclosing slotted tube D, in combination with the supporting-pulleys *t* H, the openings P, all constructed and arranged to operate substantially as described.

2. The openings P′, arranged at intermediate points in the slotted tube D, for allowing the gripping attachment to be withdrawn from the tube, substantially as and for the purpose described.

3. The depending pulley *t*, for sustaining the upward thrust of the rope inside of the tube D, at the bottom of the inclines, substantially as and for the purpose described.

In witness whereof I hereunto set my hand and seal.

ANDREW S. HALLIDIE. [L. S.]

Witnesses:
OLWYN T. STACY,
FRANK A. BROOKS.